United States Patent
Dalton

(10) Patent No.: US 12,496,882 B2
(45) Date of Patent: Dec. 16, 2025

(54) SUPPORTING GOLF-CART PIVOTAL WINDSHIELD FOR USE AS TABLE

(71) Applicant: Frederick Dalton, Bluffton, SC (US)

(72) Inventor: Frederick Dalton, Bluffton, SC (US)

( * ) Notice: Subject to any disclaimer, the term of this patent is extended or adjusted under 35 U.S.C. 154(b) by 480 days.

(21) Appl. No.: 18/075,024

(22) Filed: Dec. 5, 2022

(65) Prior Publication Data

US 2024/0181850 A1 Jun. 6, 2024

(51) Int. Cl.
*B60J 1/04* (2006.01)
*B60N 3/00* (2006.01)

(52) U.S. Cl.
CPC .............. *B60J 1/04* (2013.01); *B60N 3/001* (2013.01)

(58) Field of Classification Search
CPC ....... B60J 1/04; B60J 1/06; B60J 1/14; B60N 3/001; B60N 3/002; G09F 21/048; G09F 21/0485; B60R 11/00
USPC ......... 296/86, 87, 88, 96, 96.2; 40/591, 643, 40/644
See application file for complete search history.

(56) References Cited

U.S. PATENT DOCUMENTS

| | | | | |
|---|---|---|---|---|
| 879,195 | A * | 2/1908 | Samuel | B60J 1/06 296/87 |
| 894,271 | A * | 7/1908 | Jackson | B60J 1/06 296/87 |
| 954,101 | A * | 4/1910 | Huillier | B60J 1/04 296/96.2 |
| 1,012,670 | A * | 12/1911 | Loomis | B60J 1/06 296/87 |
| 1,447,851 | A * | 3/1923 | Howard | B60J 1/06 454/130 |
| 1,546,256 | A * | 7/1925 | Savage | B60J 1/06 296/88 |
| D358,614 | S * | 5/1995 | Hughes | D20/18 |
| 5,791,720 | A | 8/1998 | Moore et al. | |
| 6,663,158 | B1 | 12/2003 | Showalter | |
| 7,165,802 | B1 | 1/2007 | Flynn | |
| 7,267,388 | B2 | 9/2007 | Hanson, Jr. et al. | |
| 7,311,347 | B1 | 12/2007 | Aller | |
| 7,380,860 | B2 | 6/2008 | Dolan | |

(Continued)

OTHER PUBLICATIONS

Julia Bergren—MakerPipe—pipe structure on the deck Aug. 11, 2020 https://connect.makerpipe.com/home-improvement/post/installed-a-maker-pipe-structure-on-the-deck-of-the-adu-i-m-renting—or3LHeGF2G3pLjn (Year: 2020).*

(Continued)

*Primary Examiner* — Daniel J Colilla
*Assistant Examiner* — Wenwei Zhuo
(74) *Attorney, Agent, or Firm* — Perilla Knox & Hildebrandt, LLP

(57) ABSTRACT

One or more upright support members mount to a golf cart and support a lateral support member that in turn supports a pivotal windshield pane of the golf cart in a horizontal position for use as a tabletop. The lateral support member engages a top lip and/or a top portion of the pivotal windshield pane and is received in the notch space between them. The upright support members of some embodiments support the lateral support member from below in compression (e.g., the upright support members can include attachments that insert into retaining clips for the pivotal windshield) and in other embodiments they support the lateral support member from above in tension/suspension (e.g., the upright support members can include cables).

20 Claims, 14 Drawing Sheets

(56) References Cited

U.S. PATENT DOCUMENTS

| | | |
|---|---|---|
| 7,390,051 B2 | 6/2008 | Bruntz et al. |
| 7,665,792 B1 | 2/2010 | Flynn |
| 7,673,923 B2 | 3/2010 | Reese |
| 9,713,948 B2 | 7/2017 | Woodrow |
| 10,124,654 B2 | 11/2018 | Martin |
| 10,493,825 B2 | 12/2019 | Woodrow |
| 2008/0238130 A1 | 10/2008 | Simmons et al. |
| 2009/0229094 A1* | 9/2009 | Reese ................... B60J 1/06 296/96.2 |
| 2023/0234428 A1* | 7/2023 | MacNeel ............... B60J 1/06 296/86 |

OTHER PUBLICATIONS

Maker Pipe—Build Anything Out Of Inexpensive EMT Conduit—DIY Structural Pipe Fittings—YouTube Sep. 24, 2016 https://www.youtube.com/watch?v=FeCbmf8w8pc (Year: 2016).*

NPL—2015—Golfcart windshield table—Talk of The Villages Florida https://www.talkofthevillages.com/forums/villages-florida-general-discussion-73/golfcart-windshield-table-173667/ (Year: 2015).*

Photographs of a copy/recreation, made by applicant, of a device by another that was known by applicant (without a duty of confidentiality) to exist in Bluffton, SC by at least about May 2022, showing the complete device installed, the bottom of the device installed, and the complete device uninstalled.

* cited by examiner

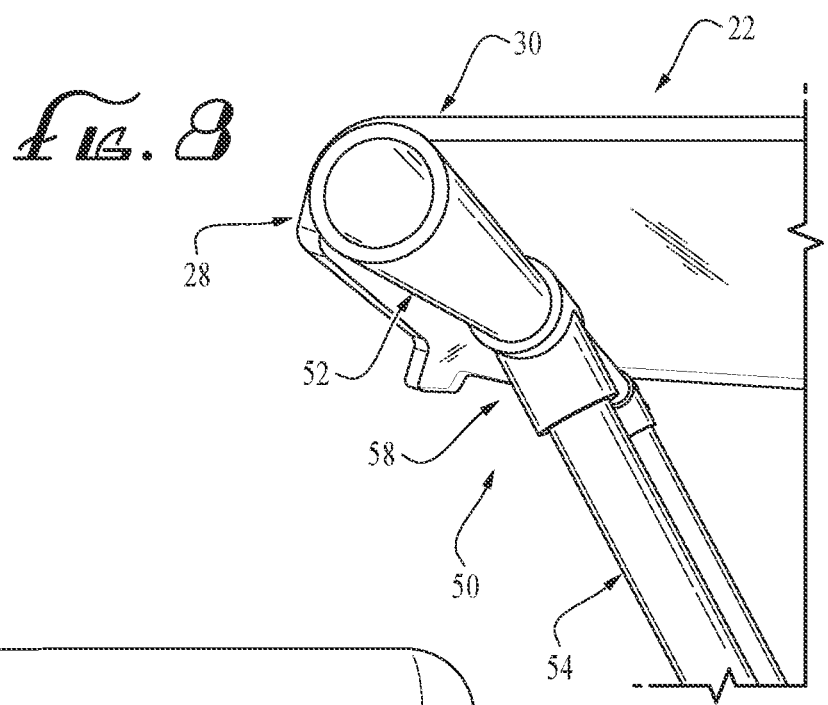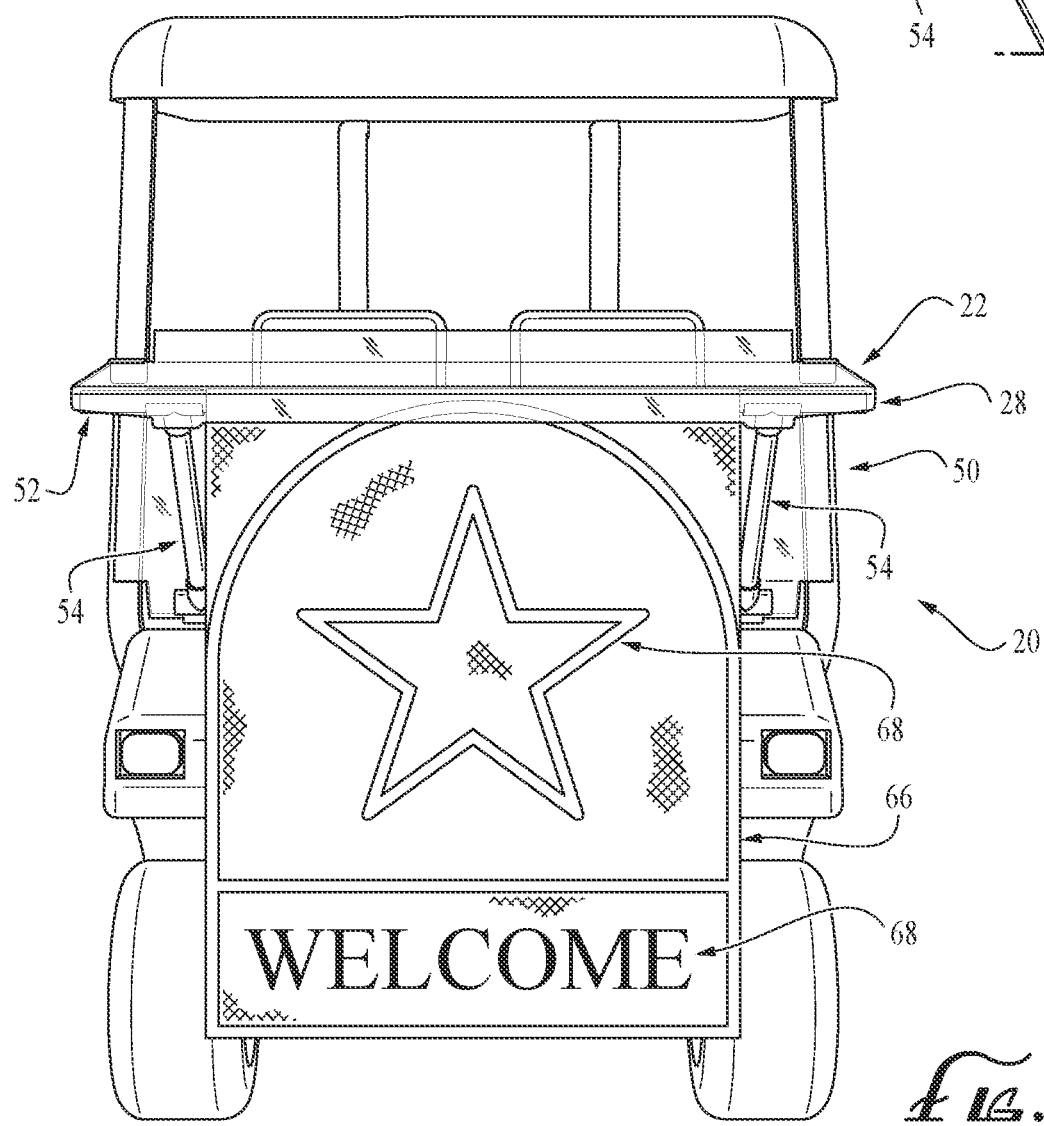

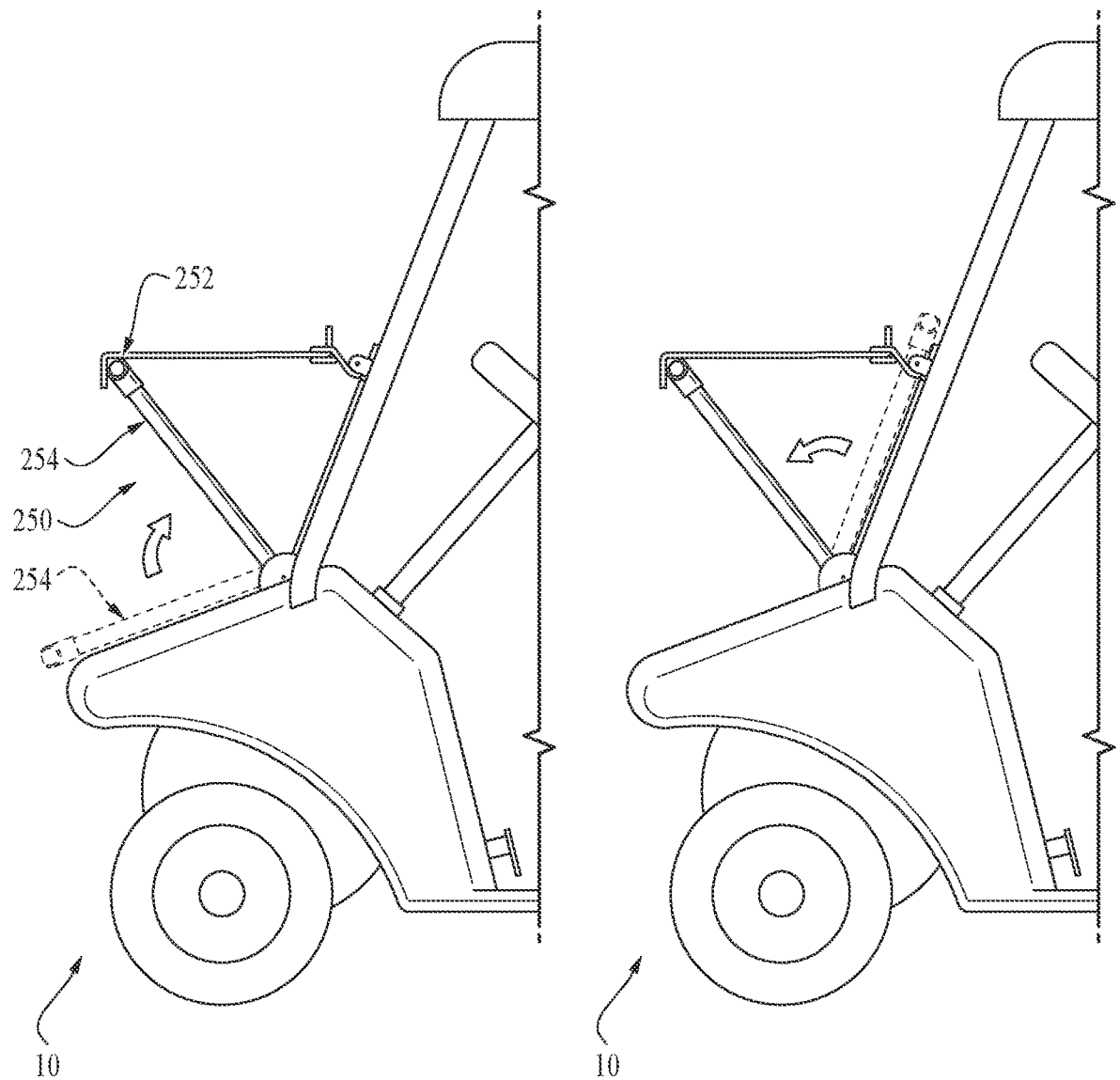

SUPPORTING GOLF-CART PIVOTAL WINDSHIELD FOR USE AS TABLE

TECHNICAL FIELD

The present invention relates generally to golf carts, and particularly to golf carts with pivotal windshield window panes.

BACKGROUND

Golf carts are commonly used for a wide range of activities in additional to playing golf. These activities include local/neighborhood transport, tailgating, gardening and property maintenance, and more. During some such activities, it would be beneficial to have more tabletop space on the golf cart. But current golf carts do not provide much flat space for tabletop use.

It has been known to prop up a pivotal windshield of a golf cart in a horizontal position by using a couple of loose sticks (e.g., wood or PVC). But the result is unstable and thus unsuitable for tabletop use.

Accordingly, it can be seen that a need exists for improvements in golf carts. It is to the provision of solutions meeting this and other needs that the present invention is primarily directed.

SUMMARY

Generally described, the present invention relates to devices and methods for supporting a golf-cart pivotal windshield in a horizontal position for use as a tabletop. The support devices each include at least one lateral support member and at least one upright support member extending from the lateral support member and supporting the pivotal windshield pane in a horizontal position for use as a tabletop. The lateral support member engages the top lip and/or the top portion of the pivotal windshield pane and is received in the space between the top lip and the top portion of the pivotal windshield pane. The at least one upright support member mounts between the golf cart and the lateral support member to support the lateral support member, and thus the pivotal windshield pane, in the horizontal position.

In example embodiments, the support devices include one lateral support member that extends across a substantial portion of the pivotal windshield pane, though multiple lateral support members can be included. Also, the support devices can include two of the upright support members, with one on each side of the golf cart, though more or fewer upright support members can be included.

In some embodiments, the upright support members support the lateral support member from below in compression (e.g., with the upright supports including bottom attachments that removably insert into the retaining clips for the pivotal windshield lip, or including a top or bottom portion pivotally mounted to a frame member of the golf cart or to the top lip of the pivotal windshield of the golf cart). In such embodiments, the upright supports are rigid with a strength (in compression) to bear the load from above. In other embodiments, the upright support members support the lateral support member from above in tension/suspension (e.g., with the upright support including a cable attached to a frame member of the golf cart).

Example support methods include positioning a support device (the same or similar to that described herein) in a use position with one or more upright support members mounted to the golf cart and with a lateral support member supported by the upright support members, and pivoting the pivotal windshield of the golf cart downward to a horizontal position where it is supported by the lateral support member for use as a tabletop while the golf cart is parked. When the user is ready to operate and move the golf cart, the process can be reversed and the support device stored until future use is desired. The method can also include attaching a display element to the support device for decorative or informative use while the golf cart is parked and the pivotal windshield used as a tabletop, with the display element also functioning as a visual indicator that the pivotal windshield is in the tabletop position and needs to be repositioned to the stowed or wind-screen position before operating and moving the golf cart.

The specific techniques and structures employed by the invention to improve over the drawbacks of the prior devices and accomplish the advantages described herein will become apparent from the following detailed description of example embodiments and the appended drawings and claims.

BRIEF DESCRIPTION OF THE DRAWINGS

FIG. 8 is a perspective view of a detailed portion of the golf cart and support device of FIG. 2, showing the top supporting engagement of the support device to the pivotal windshield of the golf cart.

FIG. 9 shows the golf cart and support device of FIG. 2, with a visual display element supported by the support device.

FIG. 17 is a side view of a portion of the golf cart of FIG. 1, showing a device that supports the pivotal windshield in an intermediate horizontal position for tabletop use according to a third example embodiment.

FIG. 18 is a side view of a portion of the golf cart of FIG. 1, showing a device that supports the pivotal windshield in an intermediate horizontal position for tabletop use according to a fourth example embodiment.

DETAILED DESCRIPTION OF EXAMPLE EMBODIMENTS

The present invention relates to devices and methods for supporting a golf-cart pivotal windshield in a horizontal position for use as a tabletop. In this way, these support devices and methods can be used with existing or new golf carts to provide additional flat space for tabletop use.

Figure 1:
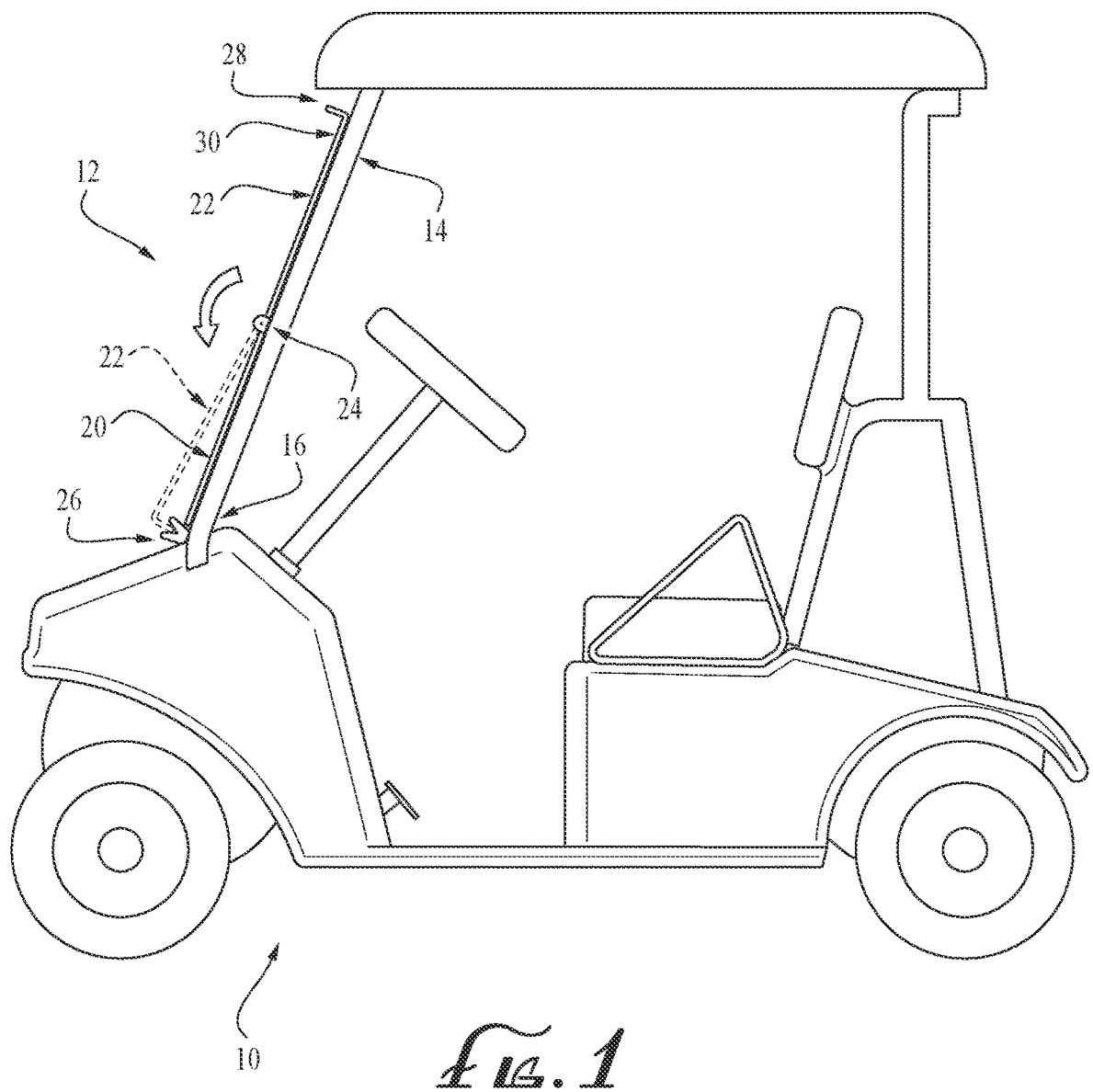
FIG. 1 is a side view of a golf cart according to the prior art, showing a pivotal windshield repositionable between wind-screen and stowed positions.
Figure 2:
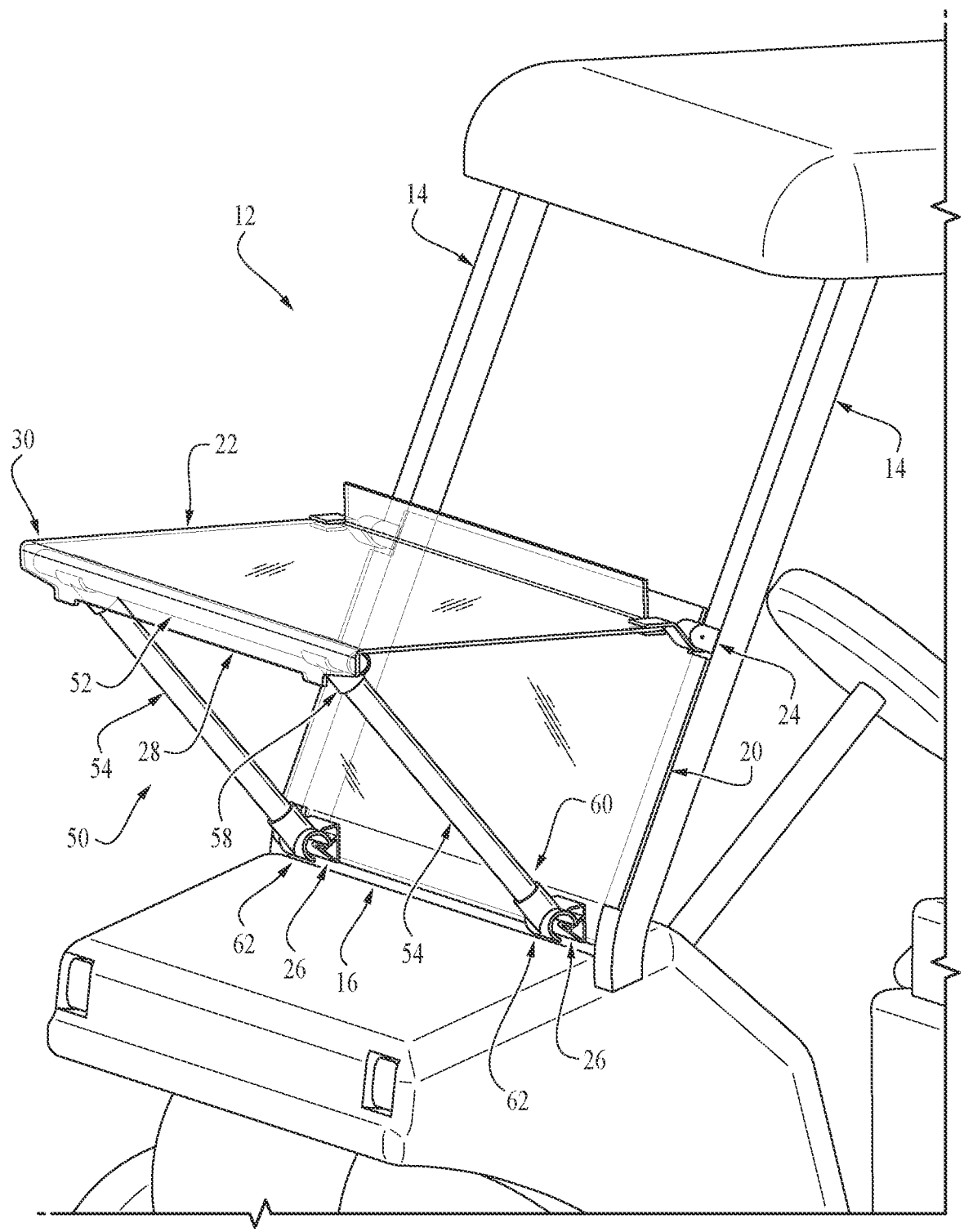
FIG. 2 is a perspective view of a portion of the golf cart of FIG. 1, showing a device that supports the pivotal windshield in an intermediate horizontal position for tabletop use according to a first example embodiment.
Figure 3:
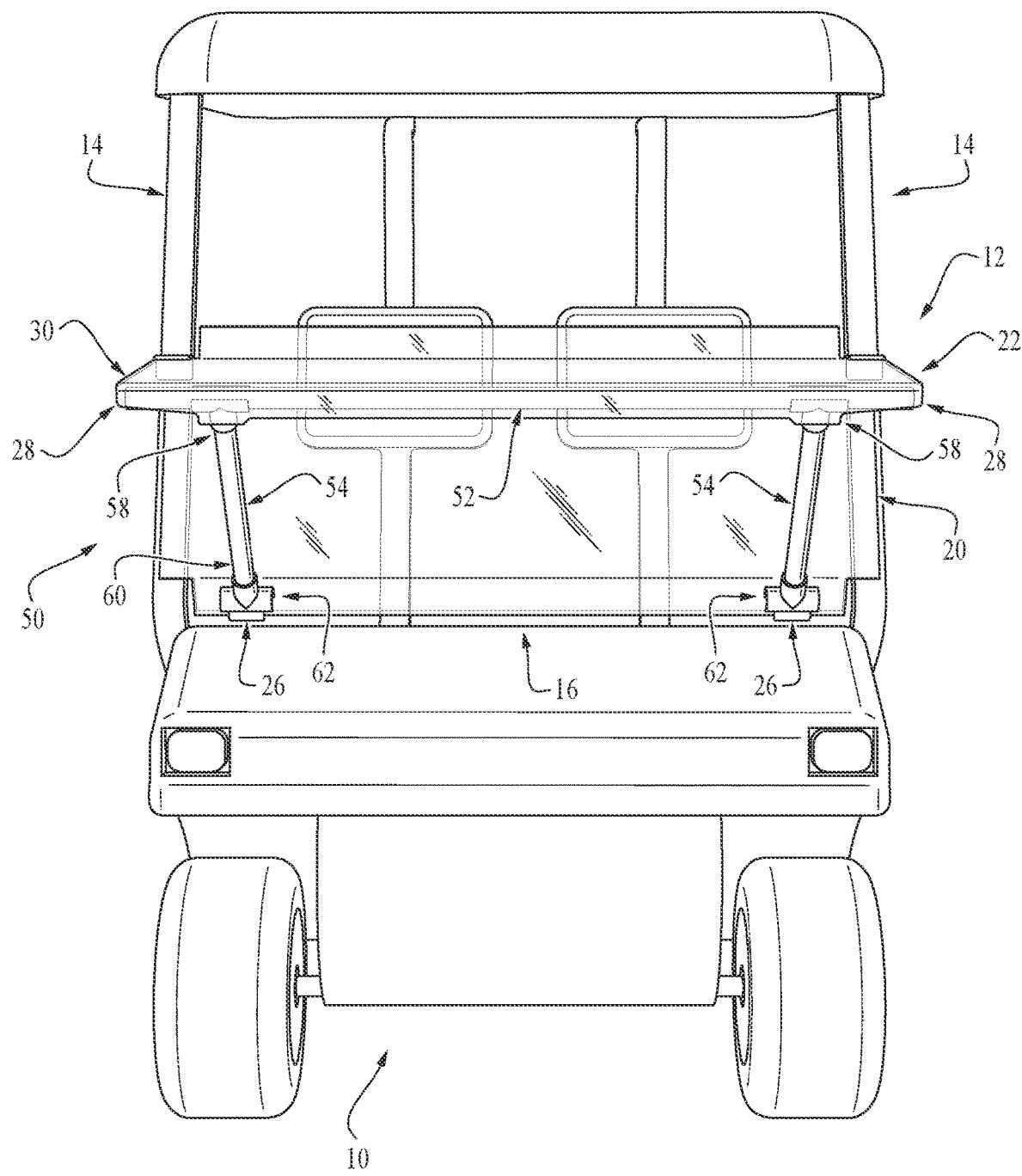
FIG. 3 is a front view of the golf cart and support device of FIG. 2.

The support devices and methods of the present invention can be used with a variety of different golf carts provided by different golf-cart manufacturers, including those shown and described herein and others. For example, FIG. 1 shows a conventional golf cart 10 with a front windshield assembly 12 and a frame assembly. The frame assembly includes two upright side frame members 14 for supporting a roof, and typically includes a horizontal bottom frame member 16 and a horizontal top frame member (not shown) extending between the upright frame members 14. The windshield assembly 12 includes a fixed bottom windshield pane 20 and a pivotal top windshield pane 22. The bottom windshield pane 20 is mounted in a fixed position to the upright frame members 14 (and/or to the bottom frame member 18 of some carts). And the top windshield pane 22 is positioned adjacent and above the bottom windshield pane 20 and is pivotally mounted 24 to the upright frame members 14. The pivotal windshield pane 22 can be pivoted between a use/windscreen position (functioning as a wind screen) and a stowed position (out of the way when not needed). In the use position (shown in solid lines), the pivotal windshield pane 22 is upright and generally parallel to the bottom windshield pane 20 and secured in place by top retaining clips (not shown). And in the stowed position (shown in broken lines), the pivotal windshield pane 22 has been pivoted downward (as shown by the angular directional arrow), folded/doubled over the bottom windshield pane 20, and secured in place by bottom retaining clips 26. There are typically two bottom retaining clips 26, with each including two resilient (e.g., natural or synthetic rubber or rubber-like) jaws defining a gripping receptacle between them, and with each for example mounted to the bottom frame member 16 and also supporting the bottom edge of the fixed windshield pane 20. The pivotal windshield pane 22 (e.g., made of an acrylic or other clear rigid material) includes a lip 28 that is secured in and by the bottom clips 26 in the stowed position. The lip 28 extends forward from the top portion 30 (when in the use position) of the pivotal windshield pane 22 and is angled (e.g., generally perpendicularly) relative to the rest of the pivotal windshield pane 22.

The support devices and methods of the present invention cooperate with this type of pivotal windshield 22 of golf carts 10 to provide advantages described herein. It should be noted that "golf carts" as used herein includes not just traditional motorized carts for playing golf on a golf course, but also golf carts for use on streets, in neighborhoods, and for other purposes as is well known in the art, and can also include utility vehicles and other motorized vehicles with pivotal windshield panes.

The support devices each include at least one lateral support member and at least one upright support member extending from the lateral support member and supporting the pivotal windshield pane 22 in a horizontal position for use as a tabletop. The lateral support member engages the top lip 28 and/or the top portion 28 of the pivotal windshield pane 22 and is received in the space (e.g., corner or notch) between the top lip 28 and the top portion 28 of the pivotal windshield pane 22. Typical embodiments include one lateral support member that extends across a substantial portion of the pivotal windshield pane 22 (typically substantially all the way across, and sometimes laterally beyond), though multiple lateral support members can be included. The at least one upright support member mounts between the golf cart (e.g., the frame assembly) and the lateral support member to support the lateral support member, and thus the pivotal windshield pane 22, in the horizontal position. Typical embodiments include two of the upright support members, with one on each side of the golf cart 10, though more or fewer upright support members can be included. The upright support members support the lateral support member from below (in compression) or from above (in tension/suspension).

FIGS. 2-10 show a device 50 for supporting the pivotal windshield 22 in a horizontal tabletop position according to a first example embodiment of the present invention. The horizontal tabletop position is between the use/windscreen position and the stowed position, with the pivotal windshield 22 swinging in an arc through the tabletop position when pivoting it between the use and stowed positions. With the pivotal windshield 22 in the horizontal tabletop position, it is horizontal and supported so that can be used as a flat tabletop area to hold a variety of objects for a variety of purposes.

The support device 50 includes a lateral support member 52 and two upright support members 54 extending from the lateral support member 52 and supporting the pivotal windshield pane 22 in the horizontal position for use as a tabletop. The lateral support member 52 and the upright support members 54 can be made of conventional materials with sufficient rigidity and strength to provide the functionality described herein, for example PVC, another hard plastic, a metal, wood, or the like, and they can be manufactured and assembled using conventional techniques. The upright support members 54 are held in place (prevented from moving transversely) by mechanical interference when supporting the pivotal windshield pane 22 in the horizontal position, with the top/first end rigidly attached to the lateral support member 52, which is constrained by the top lip 28 of the pivotal windshield pane 22, and with the bottom/second end constrained by the retaining clips 26 or another mount that mechanically retains it from moving transversely/sideways during use.

The lateral support member 52 abuts the top lip 28 and the top portion 30 (from which the top lip 28 extends) of the pivotal windshield pane 22 when the pivotal windshield pane 22 is in the horizontal tabletop position. In this use position, the lateral support member 52 is received in the space (e.g., corner or notch) between the top lip 28 and the top portion of the pivotal windshield pane 22 (see FIGS. 2 and 8). So the lateral support member 52 is prevented from moving forward by mechanical interference with the top lip 28 of the pivotal windshield pane 22, and the pivotal windshield pane 22 is prevented from moving downward by mechanical interference with the lateral support member 52. While the depicted lateral support member 52 is tubular (cylindrical), in other embodiments it can be bar-shaped (with a rectangular cross section) to provide more contact surface area with the pivotal windshield pane 22 by more closely conforming to the shape of the corner space formed between the top lip 28 and the top portion 30 of the pivotal windshield pane 22.

The lateral support member 52 has a length selected so that it extends across at least a substantial portion of the pivotal windshield pane 22 in order to support it (along with any load placed onto it) in the horizontal tabletop position. That is, the lateral support member 52 does not need to extend all the way across the pivotal windshield pane 22 in order to support it, but it should extend laterally to at least close to the side edges of the pivotal windshield pane 22. Different models of golf carts by different manufacturers have windshield assemblies with different lateral widths, and the lateral support member 52 can have a length (e.g., about 12 inches to about 20 inches) so that it can be used with a variety of different golf cart models to provide the needed support for the pivotal windshield pane. For support devices 50 with relatively longer lateral support members 52 and/or for golf carts 10 with relatively narrower-width windshield assemblies 12, the lateral support member 52 can extend laterally outward beyond the side edges of the pivotal windshield pane 22.

Figure 4:
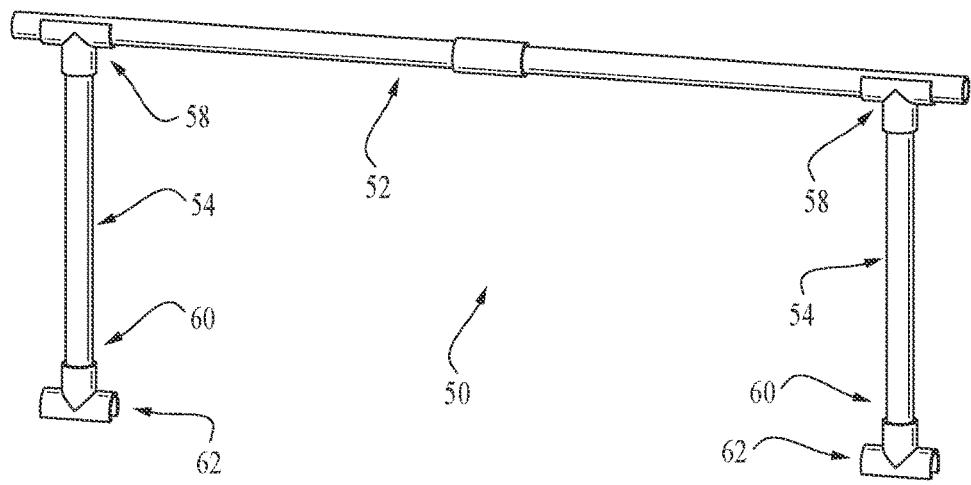
FIG. 4 is a front view of the support device of FIG. 2.
Figure 5:
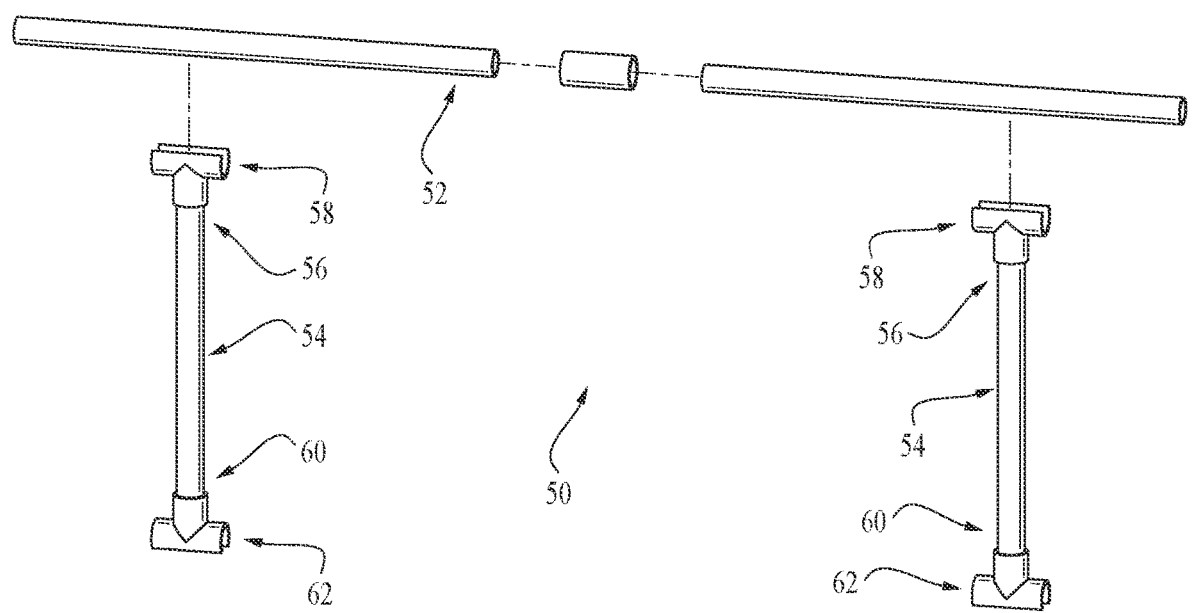
FIG. 5 shows the support device of FIG. 4 in a disassembled condition.
Figure 6:
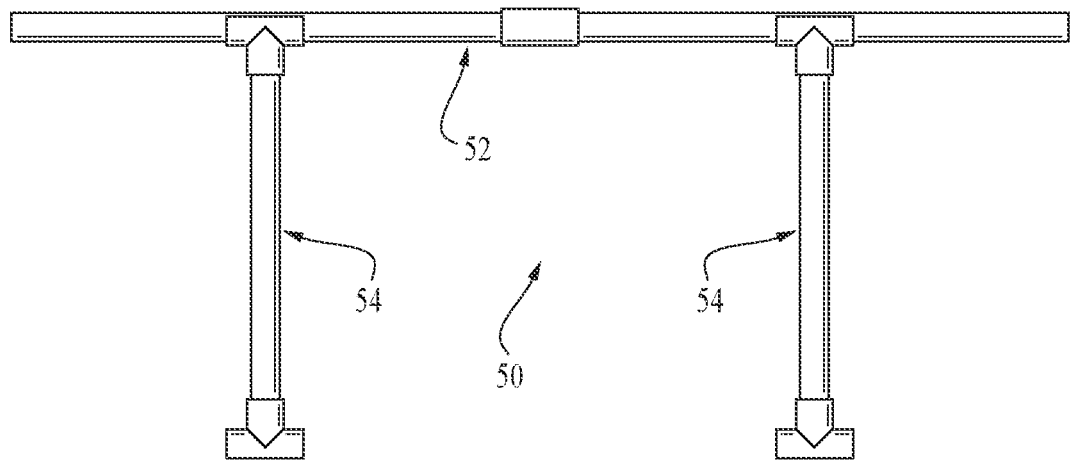
FIG. 6 is a front view of the support device of FIG. 2 with the upright supports in a narrowed configuration.
Figure 7:
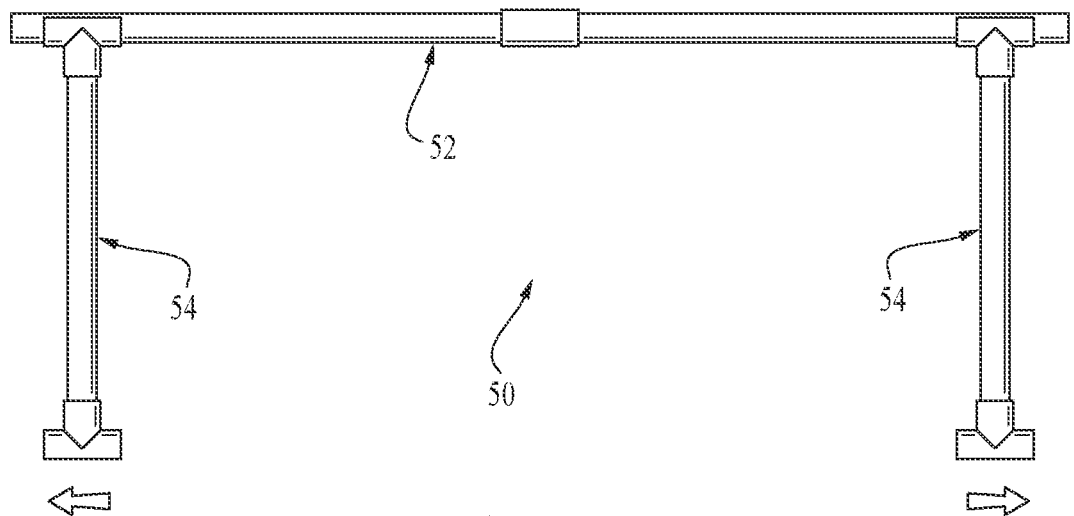
FIG. 7 shows the support device of FIG. 6 rearranged into a wider narrowed configuration.

In some embodiments, the lateral support member includes multiple segments that the user can couple together and decouple as needed. For example, the depicted lateral support member 52 includes two segments that connect together by a coupling, as shown in FIGS. 4-5. In this way, when the support device 50 is not in use, the lateral support member 52 can be disassembled into a more compact state so it can be more easily stored and transported on the golf cart 10.

In other embodiments, the lateral support member includes multiple segments that are not connected together, for example two segments with each having a respective one of the upright support members extending from it, with each of the two combination upright/lateral frame members being a separate component that can be separately installed into the horizontal tabletop use position. When in use to support the pivotal windshield pane 22 in the horizontal position, the two segments of the lateral support member still extend across at least a substantial portion of the pivotal windshield pane 22, but there may be a gap between the two segments.

The upright support members 54 mount between the golf cart 10 (e.g., the frame assembly) and the lateral support member 52 to support the lateral support member 52, and thus the pivotal windshield pane 22, in the horizontal position. The depicted embodiment includes two of the upright support members 54, with one on each side of the golf cart 10. Other embodiments include one centrally positioned upright support member, a framework of multiple upright support members, or two upright support members that merge at one end and are spaced apart at the opposite end in a triangular configuration.

The upright support members 54 can mount to the lateral support member 52 by conventional mounting elements known in the art. For example, the first ends 56 of the upright support members 54 can adjustably and/or removably mount to the lateral support member 52 by couplings 58. In the depicted embodiment, the adjustable and removable couplings 58 are snap-fit T-shaped couplings, though other conventional removable couplings (e.g., clamps, push-pin connectors, brackets, etc.) can be used to provide the functionality described herein. The depicted couplings 58 are fixedly attached (e.g., glued) to the first end 58 of the upright support 54 and adjustably and removably attachable to the lateral support 52, though in other embodiments they can be fixedly attached to the lateral support 52 and removably attachable to the upright support 54. The adjustably of the couplings 58 enables the user to mount the upright support members 54 at user-selected locations along the lateral support member 52, with the upright support members 54 positioned closer together (see FIG. 6) or farther apart (see FIG. 7). In this way, the support device 50 can be used with a variety of different golf cart models, because the second opposite ends 60 of the upright support members 54 to be positioned where needed to mount to different golf cart models. And the removability of the couplings 58 enables the upright supports to be removed from the lateral support member for compact storage.

The second ends 60 of the upright support members 54 mount to the golf cart 10 to support the lateral support member 52, and thus the pivotal windshield pane 22, in the horizontal tabletop position. In the depicted embodiment, the upright support members 54 support the lateral support member 52 from below, with the upright support members 54 loaded in compression when the support device 50 is in the use position, with the upright supports being rigid with a strength (in compression) to bear the load from above.

The upright support members 54 typically mount to the golf cart 10 at a location that is rearward (relative to the front of the golf cart 10) from the top lip 28 of the pivotal windshield pane 22 when the pivotal windshield pane 22 is in the horizontal tabletop position. So in the use position, the upright support members 54 extend upward and forward (at an angle from vertical) from where they mount to the golf cart 10 (see FIGS. 2 and 8). In this way, the upright support members 54 (and the lateral support member 52 attached to them) are prevented from moving rearward. (As noted above, the lateral support member 52 is prevented from moving forward by mechanical interference with the top lip 28 of the pivotal windshield pane 22.)

The second ends 60 of the upright support members 54 can mount to the golf cart 10 in various ways. In the depicted embodiment, the second ends 60 of the upright support members 54 each include a respective attachment 62 that mounts to one of the retaining clips 26 of the golf cart 10. As noted above, the retaining clips 26 receive and secure the top lip 28 of the pivotal windshield pane 22 when it is in the stowed position (see FIG. 1). But with the pivotal windshield pane 22 in the horizontal position, the clips 26 are unused and thus clear and available for use to mount the upright support members 54 to the golf cart 10.

Figure 10:
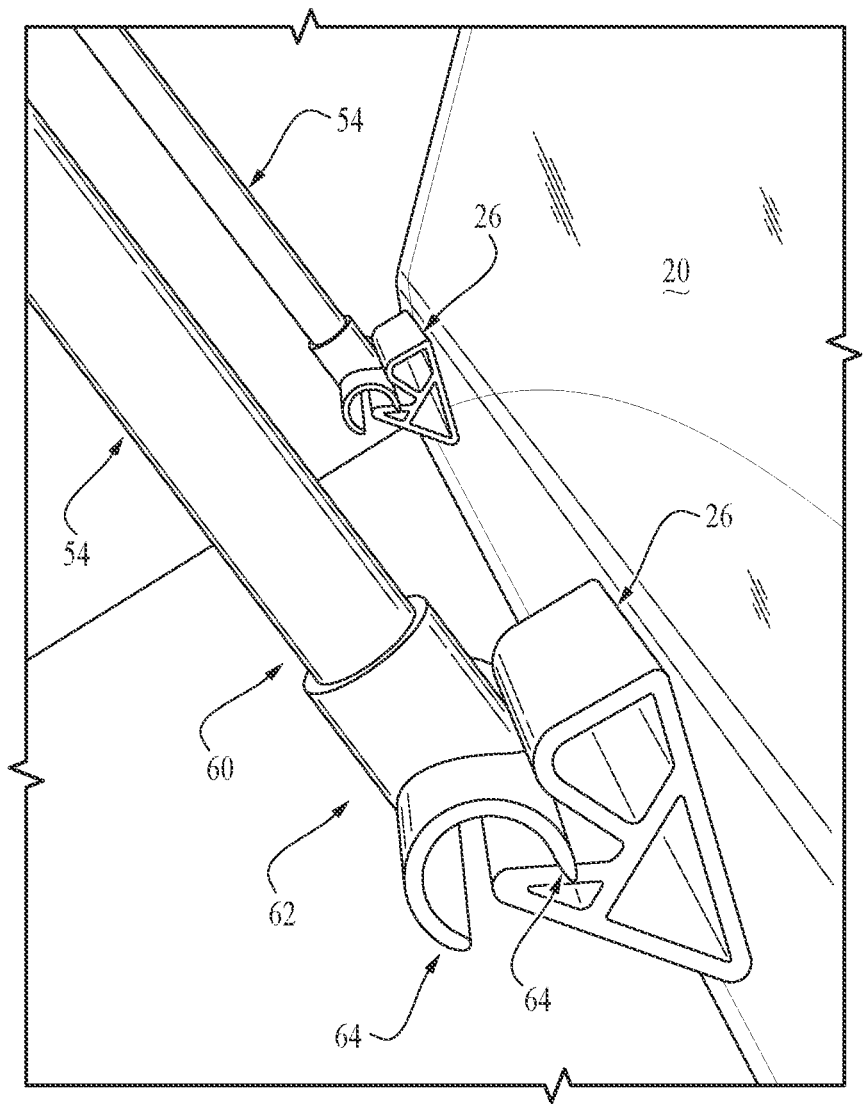
FIG. 10 is a perspective view of a detailed portion of the golf cart and support device of FIG. 2, showing the bottom supporting engagement of the support device to the windshield retaining clips of the golf cart.
Figure 11:
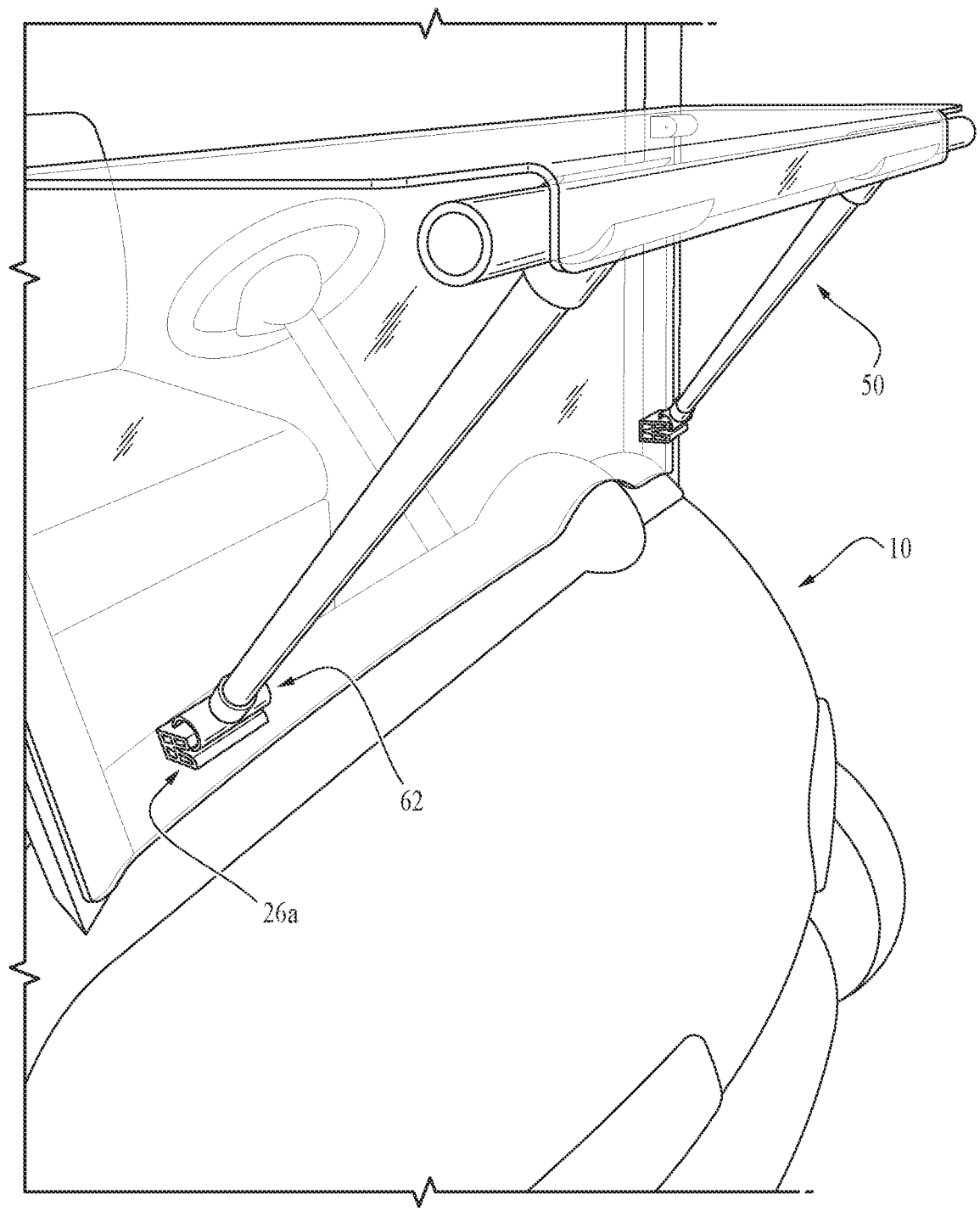
FIGS. 11-15 are perspective views of detailed portions of golf carts by different manufacturers, showing the attachment of the upright support members to the different designs of retaining clips.
Figure 12:
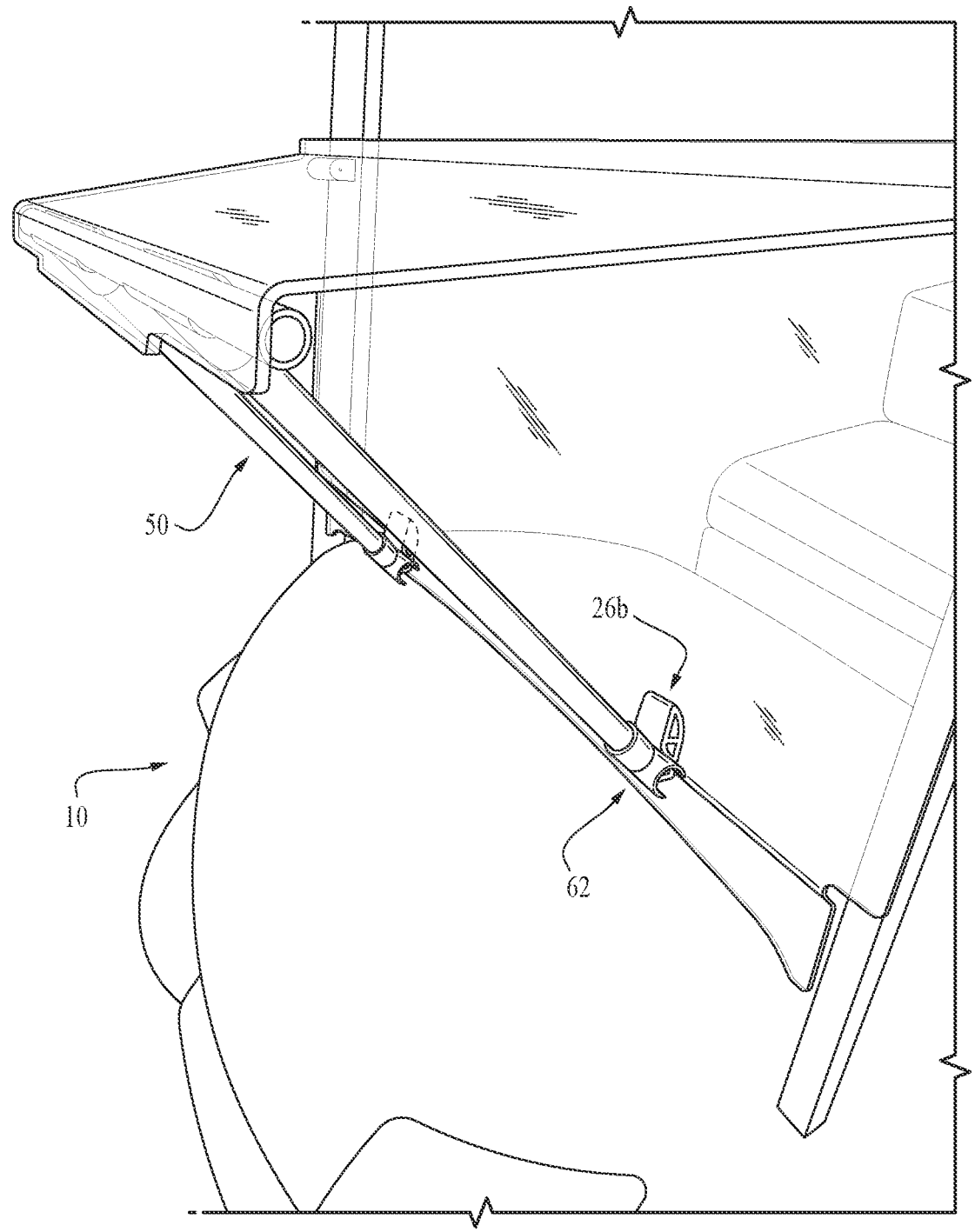
Figure 13:
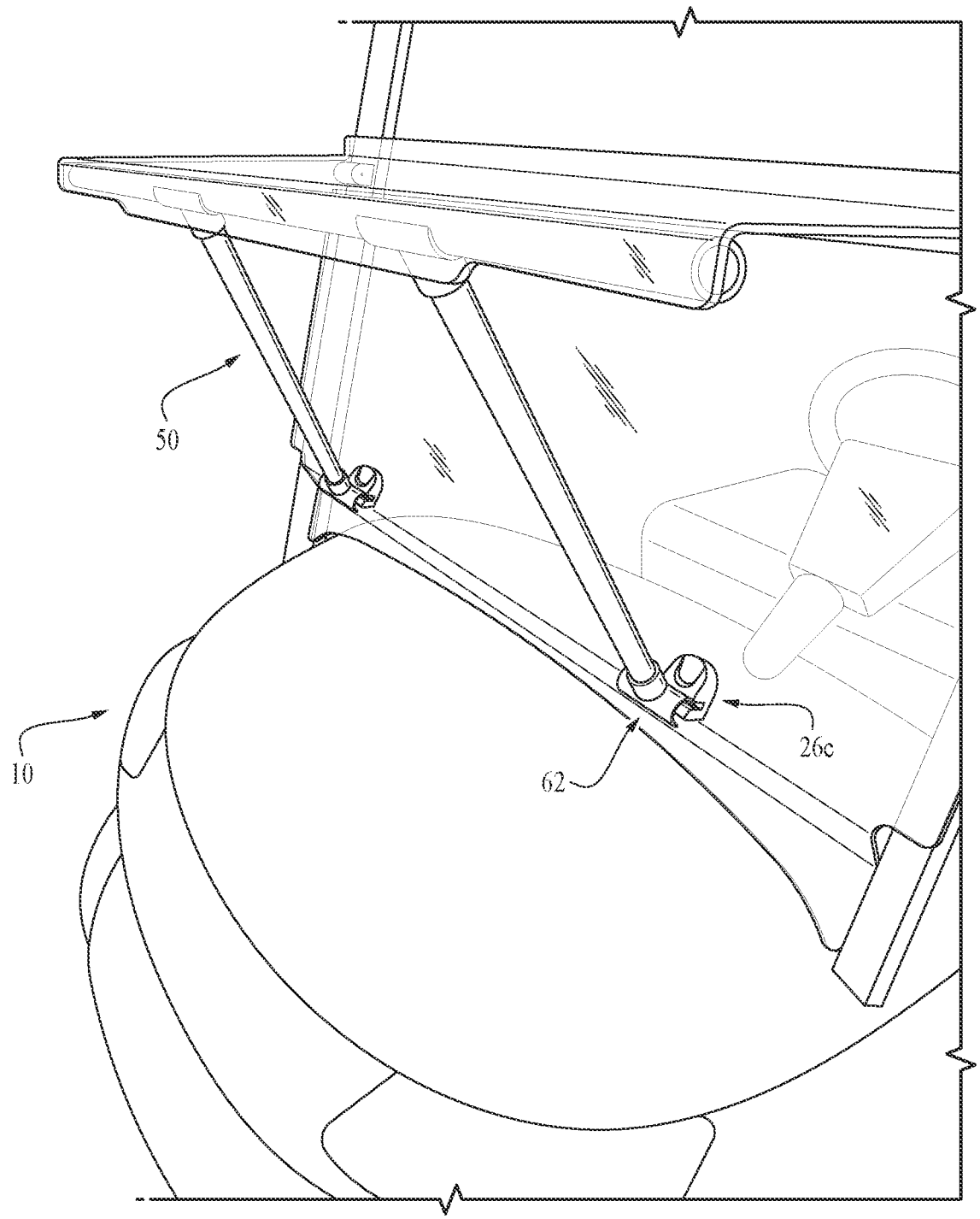
Figure 14:
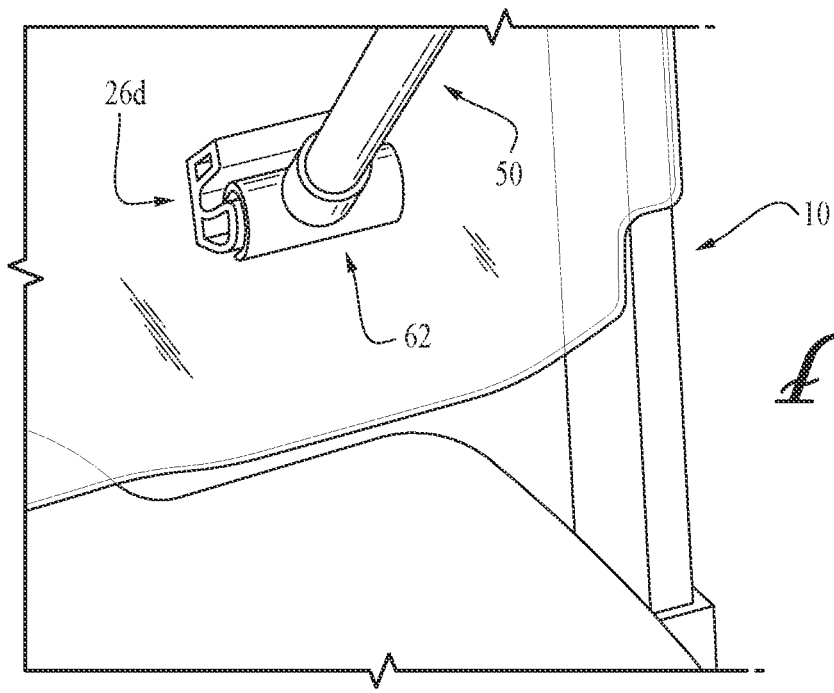
Figure 15:
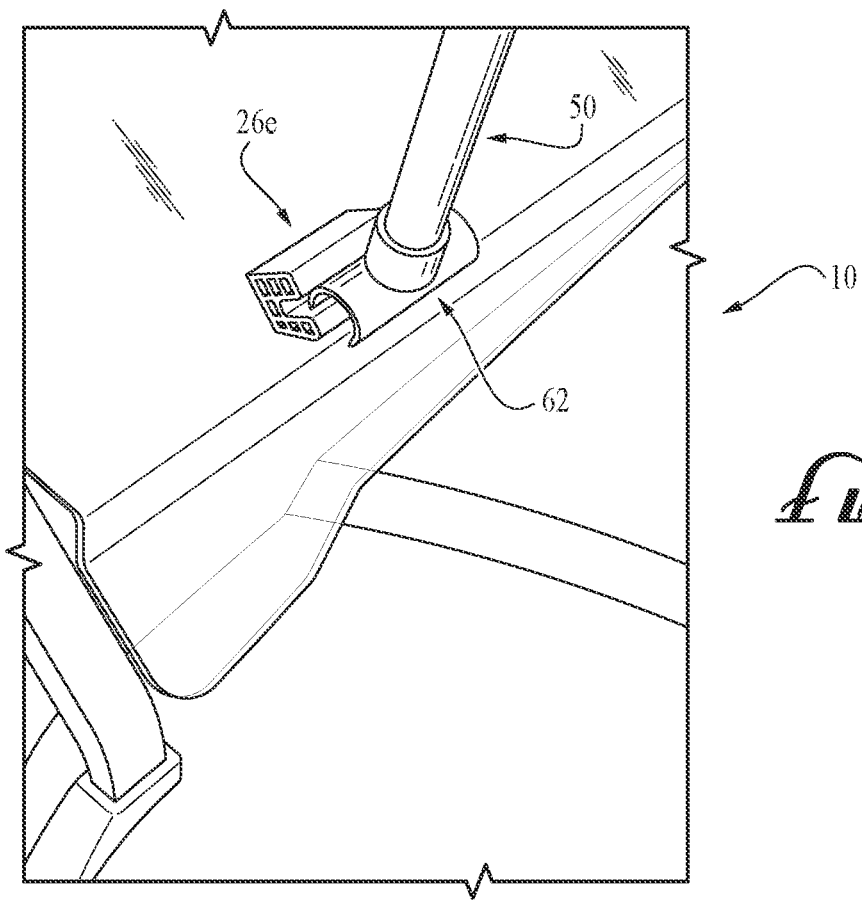

The attachments 62 each include at least one tab 64 that is configured to be inserted into and securely received in one of the clips 26 (see FIG. 10). The tabs 64 can each have about the same thickness and insertion depth as the top lip 28 of the pivotal windshield pane 22 so that they are received and secured in the gripping receptable formed between the jaws of the clips 26. In the depicted embodiment, the attachments 62 are snap-fit T-shaped couplings, with two tabs 64 that are curved and that cooperatively form a semi-circular shape, and with the coupling fixedly attached (e.g., glued) to the second end 60 of the upright support 54.

In other embodiments, the attachments can be provided by other conventional structural elements (e.g., brackets, tongues, blades, etc.) that include a tab (e.g., curved, planar, undulating, notched, etc.) that can be received and secured in the clips 26 to provide the functionality described herein. Such other embodiments include multiple tabs that are generally parallel (e.g., attachments made of rectangular channel or square tubing), multiple tabs that are not parallel (e.g., attachments made of flared channel or a Y-shaped member), or a single tab. At least one of the tabs (whether curved, planar, or otherwise configured) is typically angled with respect to the upright support member 54 so that, when it's received in the clips 26 in the use position of the support device, it has the same orientation as the top lip 28 does when it's received in the clip 26 with the pivotal windshield 22 in the stowed position.

In addition, a display element 66 can be mounted to (and included as a component of) the support device 50 while the golf cart 10 is parked and the pivotal windshield 22 used as a tabletop. The display element 66 can include decorative or informative indicia 68 on it, for example sports team logos, signage, or the like. The display element 66 can be in the form of a flag, banner, or other sheet of material (e.g., fabric or plastic), for example as depicted. The decorative or informative indicia 68 can be placed onto the display element 66 using conventional techniques for example printing or stitching. The display element 66 can be hung from the lateral support member 52, for example it can include a top loop through which the lateral support member 52 can be inserted, for example as depicted. In addition to functioning to visually display the indicia 68, the display element 66 also functions as a visual indicator (i.e., alert or warning) that the pivotal windshield 22 is in the tabletop position and needs to be repositioned to the stowed or wind-screen position before operating and moving the golf cart.

As noted above, different models of golf carts 10 have different pivotal windshield assemblies. The support device 50 of the depicted embodiment can be used with a variety of different models of golf carts 10 by different manufacturers. For example, the attachment 62 with the two tabs 64 can be removably inserted and securely received in different designs of retaining clips 26*a-e* (for the pivotal windshield lip) provided by different golf cart manufacturers, as shown in FIGS. 11-15. These figures also show how the lateral support member 52 can extend laterally beyond the side edges of the pivotal windshield 22 in some embodiments (e.g., FIG. 11), and how the upright support members 54 can be repositioned (as described with reference to FIGS. 6-7) between relatively wider positions (e.g., FIG. 11) and relatively narrower positions (e.g., FIGS. 12-13).

Figure 16:
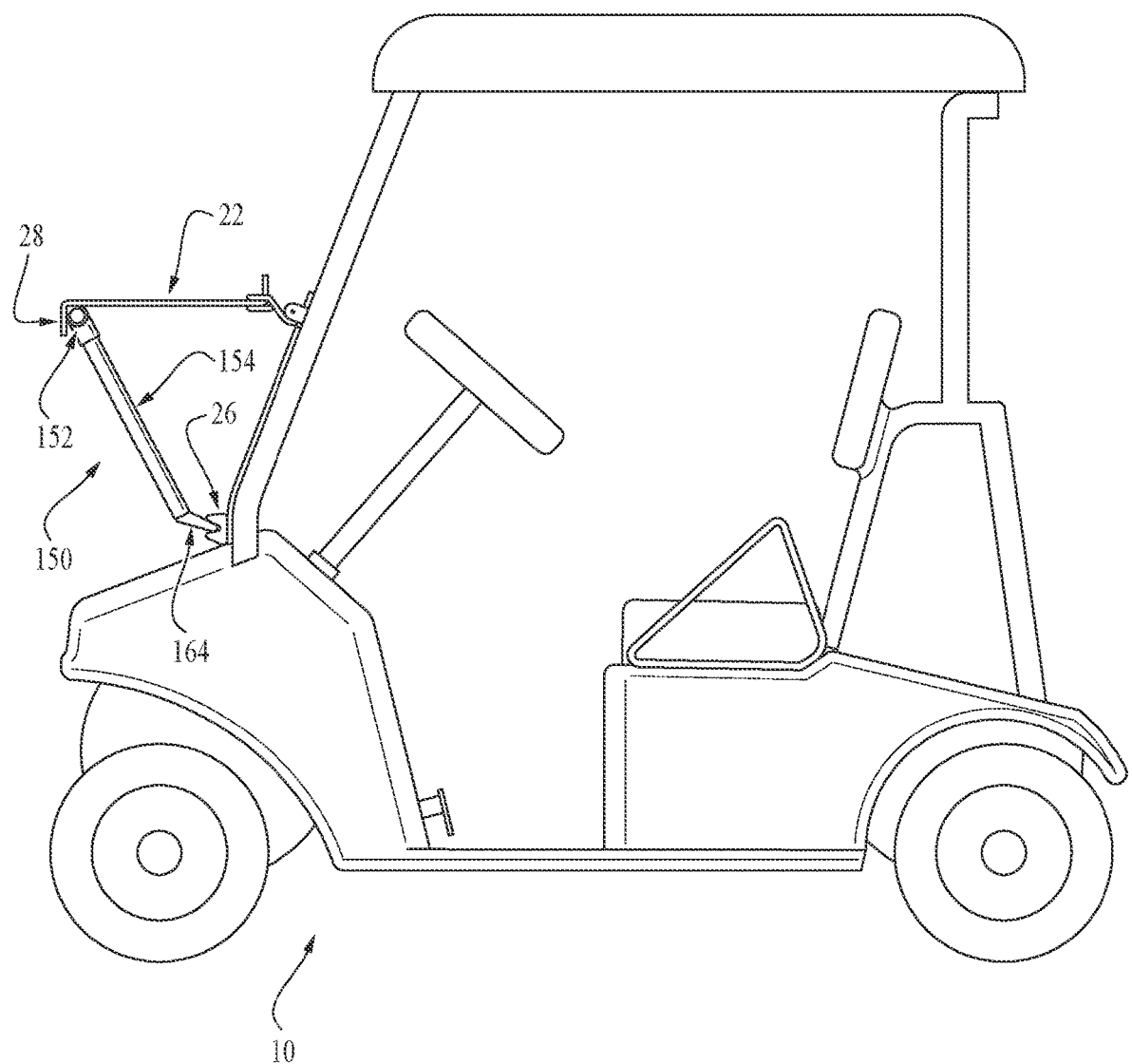
FIG. 16 is a side view of the golf cart of FIG. 1, showing a device that supports the pivotal windshield in an intermediate horizontal position for tabletop use according to a second example embodiment.

FIG. 16 shows a support device 150 according to a second example embodiment. The support device 150 is the same, or substantially the same, as that of the first example embodiment, except as expressed noted, and so for brevity details are not repeated.

In particular, the support device 150 includes a lateral support member 152 and one or more upright support members 154, with different attachments 162 that removably mount the upright support members 154 to the retaining clips 26. In this embodiment, the attachments 162 each include a single tab 164 that is angled with respect to the upright support member 154 so that, when the tabs 164 are received in the clips 26 in the use position of the support device 150, they have the same orientation as the pivotal windshield top lip 28 does when its received in the clips 26 with the pivotal windshield 22 in the stowed position. For example, the angle between the tabs 164 and their respective upright support members 154 can be about the same as the angle formed between the upright support members 154 and the pivotal windshield top lip 28 when the pivotal windshield 22 is in the horizontal tabletop position.

In other embodiments, the attachments at the bottom portions of the upright support members have configurations selected to mate with specific retaining clips of one particular golf cart manufacturer. It will be understood that the attachments can be provided in other configurations as may be desired for a particular application and/or additional purpose.

FIG. 17 shows a support device 250 according to a third example embodiment. The support device 250 is the same, or substantially the same, as that of the first example embodiment, except as expressed noted, and so for brevity details are not repeated.

In particular, the support device 250 includes a lateral support member 252 and one or more upright support members 254, with different attachments 262 that mount the upright support members 254 to the golf cart 10. In this embodiment, instead of removably mounting the upright support members 254 to the retaining clips, the attachments 262 pivotally mount the upright support members 254 to the golf cart 10, for example to the bottom horizontal frame member. The attachments 262 can be a conventional type of pivotal mount, for example a hinge. Also, the attachments 262 can be fixedly attached to the golf cart 10, and not thus removable for when not in use. In this way, the upright support members 254 can be pivoted from a stored position (shown in broken lines), where they can be secured in place (e.g., laid down against the front hood of the golf cart 10) when not in use while the golf cart 10 is operated and moved, to the use position (shown in solid lines), with the pivoting motion shown by the angular directional arrow.

FIG. 18 shows a support device 350 according to a fourth example embodiment. The support device 350 is the same, or substantially the same, as that of the third example embodiment, except as expressed noted, and so for brevity details are not repeated.

In particular, the support device 350 includes a lateral support member 352 and one or more upright support members 354, with attachments 362 that mount the upright support members 354 to the golf cart 10. In this embodiment, the attachments 362 are pivotal mounts such as those of the fourth embodiment. However, the upright support members 354 can be pivoted from a stored position (shown in broken lines), where they can be secured in place (upright and against the upright frame members of the golf cart 10) when not in use while the golf cart 10 is operated and moved, to the use position (shown in solid lines), with the pivoting motion shown by the angular directional arrow. In this embodiment, the lateral support member 352 extends laterally outward beyond the side edges of the pivotal windshield, and the upright support members 354 attach to the lateral support member 352 at these extended portions, so that when in the upright support members 354 are in the stored position they do not interfere with the pivotal mounting of the pivotal windshield to the golf cart 10.

In other embodiments, the attachments can mount the upright support members to the golf cart 10 by other attachments and at other locations, as understood by persons of ordinary skill in the art. For example, in some embodiments, the attachments removably mount the upright support members to the golf cart 10 (e.g., the attachments can include indents in the frame assembly, hood, or other component of the golf cart that removably receive mating bottom-portion ends of the upright support members). In these and other embodiments (e.g., the first example embodiment), the top portions of the upright support members and/or the lateral support member can be pivotally mounted to the pivotal windshield (e.g., at the top lip), with the support device then pivotal between the use position (as in the embodiments disclosed herein) and a stored position secured to and pivoting with the pivotal windshield.

In some other embodiments, the support device is provided with and includes two-part attachments, each including a first mating attachment part that is mountable to the golf cart and a second mating attachment part that mates/couples with the first mating attachment part and is on the respective upright support member. For example, the first mating parts can be rubber or similar retaining clips (or other conventional coupling parts) that can be independently attached (e.g., by an adhesive, screw, or other conventional mounting technique) to the golf cart (e.g., near the bottom of the lower windshield pane and near the retaining clips for the upper pivotal windshield pane). In this way, the supporting device is universal for use with any model of golf cart regardless of the particular design of the pivotal windshield retaining clips.

Figure 19:
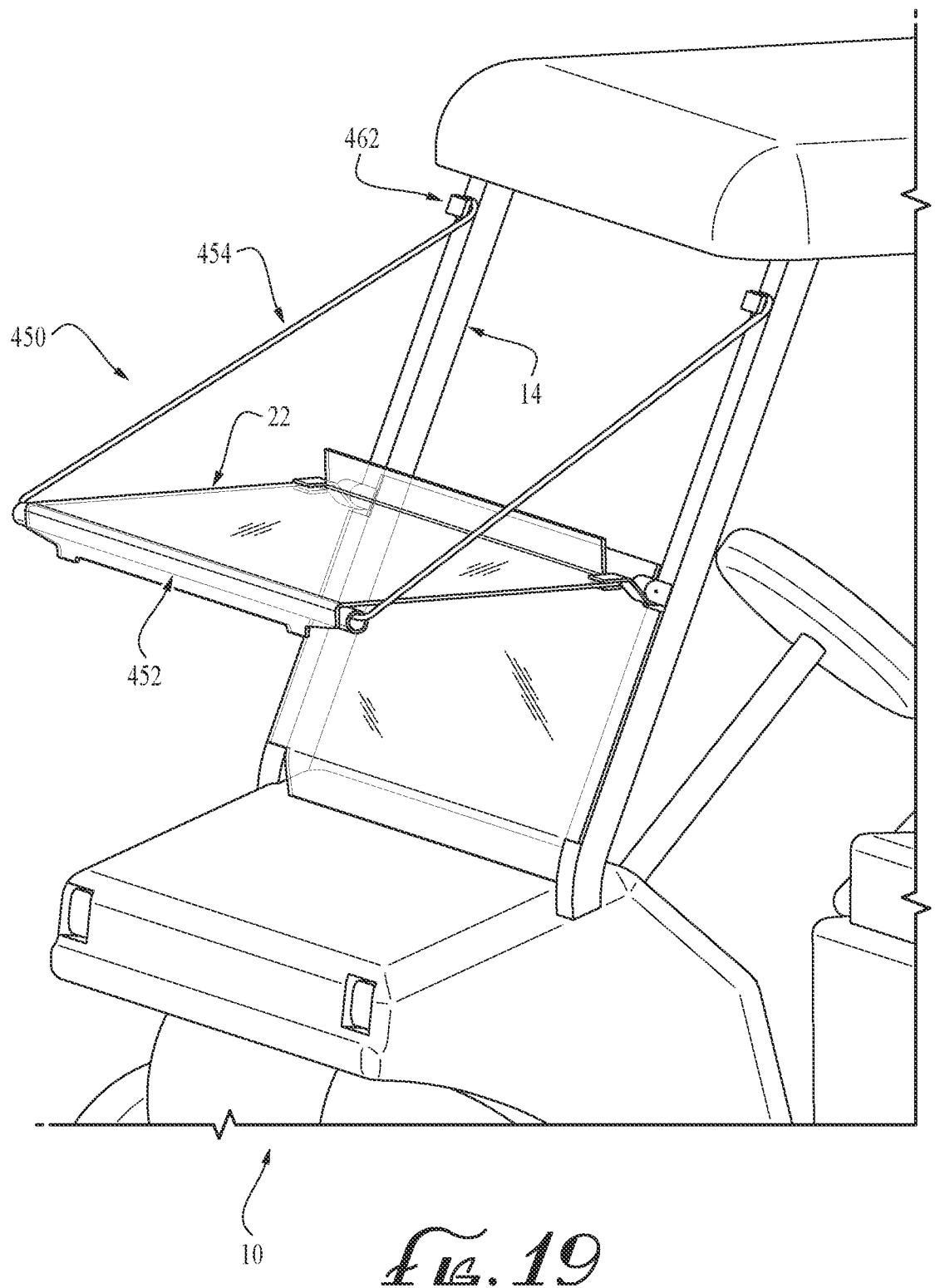
FIG. 19 is a side view of a portion of the golf cart of FIG. 1, showing a device that supports the pivotal windshield in an intermediate horizontal position for tabletop use according to a fifth example embodiment.

FIG. 19 shows a support device 450 according to a fifth example embodiment. The support device 450 is the same, or substantially the same, as that of the first example embodiment, except as expressed noted, and so for brevity details are not repeated.

In particular, the support device 450 includes a lateral support member 452 and one or more upright support members 454. In this embodiment, instead of supporting the lateral support member 452 from below in compression, the upright support members 454 support the lateral support member 452 (and thus the pivotal windshield 22) from above in tension/suspension. In this embodiment, the upright support member 454 is still coupled to the lateral support member 452 in the use position, but it extends rearward and upward to attach to the golf cart 10. The upright support member 454 can attach to the golf cart 10, for example at the upright frame members 16, by an attachment 462 of a conventional type such as a clamp, bracket, eyebolt, or other attachment device that provides the functionality described herein. In addition, the upright support members 454 of this embodiment can be non-rigid, for example a cable (e.g., cord, chain, band, etc.) that is flexible but does not extend/stretch under the tension of the weight supported in suspension during normal intended use.

Additional example embodiments include support methods for supporting a golf-cart pivotal windshield 22 in a horizontal position for use as a tabletop. The methods can be performed using a support device of the same type, or similar, as those disclosed herein. The methods include positioning a support device in a use position with one or more upright support members mounted to the golf cart 10 and with a lateral support member supported by the upright support members, and pivoting the pivotal windshield 22 of the golf cart 10 downward to a horizontal position where it is supported by the lateral support member for use as a tabletop while the golf cart 10 is parked. (If the pivotal windshield is in the folded-over stowed position, then it must be first pivoted up to the windscreen use position.) When the user is ready to operate and move the golf cart 10, the process can be reversed and the support device stored until future use is desired. The methods can also include attaching a display element to the support device for decorative or informative use while the golf cart 10 is parked and the pivotal windshield 22 used as a tabletop, with the display element also functioning as a visual indicator that the pivotal windshield 22 is in the tabletop position and needs to be repositioned to the stowed or wind-screen position before operating and moving the golf cart 10.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in example forms, it will be apparent to those skilled in the art that many modifications, additions, and deletions can be made therein without departing from the spirit and scope of the invention as defined by the following claims.

What is claimed is:

1. A device for supporting a pivotal windshield pane of a golf cart for use as a tabletop, the pivotal windshield pane including a top lip angled and extending from the pivotal windshield pane, the support device comprising:
    at least one lateral support member that engages the top lip of the pivotal windshield pane and is received in a space between the top lip and a top portion of the pivotal windshield pane from which the top lip extends;
    two upright support members extending from the lateral support member, with one on each end of the lateral support member and thus on each side of the golf cart, and supporting the pivotal windshield pane in a horizontal position for tabletop use, wherein a first end of each upright support member extends from the lateral support member and a second opposite end of the upright support member mounts to the golf cart to support the pivotal windshield pane in the horizontal position for tabletop use; and
    a display element that is mountable to the lateral support member so that it can be hung from the lateral support member while the golf cart is parked and the pivotal windshield is in the horizontal position for tabletop use, wherein the display element includes decorative and/or informative indicia on it,
    wherein the lateral support member extends laterally all the way between the two upright support members on the sides of the golf cart so that the lateral support member double-functions to support the pivotal windshield pane in the horizontal position for tabletop use and also to provide a location for the display element to hang from,
    wherein the display element double-functions to display the decorative and/or informative indicia and to also provide a visual indicator that the pivotal windshield is in the horizontal position for tabletop use while the golf cart is parked and thus provide a warning or alert that the pivotal windshield needs to be repositioned from the horizontal position before operating the golf cart.

2. The support device of claim 1, wherein the lateral support member extends laterally all the way across the pivotal windshield pane.

3. The support device of claim 1, wherein the lateral support member includes multiple segments that can be coupled together for use and disassembled for storage.

4. The support device of claim 1, wherein the first end of each upright support member adjustably mounts to the lateral support member by a coupling so that the upright support members can be mounted at user-selected locations along the lateral support member to position the second end of the upright support members where needed to mount to the golf cart.

5. The support device of claim 1, wherein the upright support members mount to the golf cart at a location that is rearward from the top lip of the pivotal windshield pane, and is angled from vertical, when the pivotal windshield pane is in the horizontal position for tabletop use.

6. The support device of claim 1, wherein the upright support members mount the lateral support member from below, with the upright support members loaded in compression, when the pivotal windshield pane is in the horizontal position for tabletop use.

7. The support device of claim 1, wherein the upright support members mount the lateral support member from above in suspension, with the upright support member loaded in tension, when the pivotal windshield pane is in the horizontal position for tabletop use.

8. A method of supporting the pivotal windshield pane in the horizontal position for tabletop use using the support device of claim 1, comprising:
if the pivotal windshield pane is in a folded-over stowed position, then pivoting it to a windscreen use position;
positioning the support device in a use position with the upright support members mounted to the golf cart and with the lateral support member supported by the upright support members; and
pivoting the pivotal windshield pane of the golf cart downward to the horizontal position where it is supported by the lateral support member for use as a tabletop while the golf cart is parked.

9. The support device of claim 1, wherein the lateral support member is removably coupled to the two upright support members by couplings so that the two upright support members can be removed from the lateral support member for compact storage.

10. The method of claim 8, further comprising:
mounting the display element to the lateral support member so that it hangs from the lateral support member while the golf cart is parked and the pivotal windshield is in the horizontal position for tabletop use;
visually observing the visual indicator of the display element indicating that the pivotal windshield is in the horizontal position for tabletop use while the golf cart is parked, wherein the visual indicator provides an alert or warning; and
in response to the alert or warning, repositioning the pivotal windshield from the horizontal position for tabletop use before operating the golf cart.

11. A device for supporting a pivotal windshield pane of a golf cart for use as a tabletop, the pivotal windshield pane including a top lip angled and extending from the pivotal windshield pane, the support device comprising:
at least one lateral support member that engages the top lip of the pivotal windshield pane and is received in a space between the top lip and a top portion of the pivotal windshield pane from which the top lip extends; and
at least one upright support member extending from the lateral support member and supporting the pivotal windshield pane in a horizontal position for tabletop use, wherein a first end of the upright support member extends from the lateral support member and a second opposite end of the upright support member mounts to the golf cart to support the pivotal windshield pane in the horizontal position for tabletop use, wherein the upright support member includes an attachment that mounts the second end of the upright support member to the golf cart,
wherein the golf cart includes at least one retaining clip that receives and secures the lip of the pivotal windshield pane in a stowed position, and wherein the attachment includes at least one tab that is received and secured in the retaining clip when the pivotal windshield pane is in the horizontal position for tabletop use.

12. The support device of claim 11, wherein the upright support member includes two upright support members, with one on each side of the golf cart.

13. The support device of claim 11, wherein the tab of the attachment is angled with respect to the upright support member.

14. The support device of claim 11, wherein the attachment pivotally mounts the upright support member to the golf cart.

15. The support device of claim 11, further comprising a display element that is mountable to the lateral support member so that it can be hung from the lateral support member while the golf cart is parked and the pivotal windshield is in the horizontal position for tabletop use.

16. The support device of claim 15, wherein the display element includes decorative and/or informative indicia on it also functions as a visual indicator that the pivotal windshield is in the horizontal position for tabletop use and needs to be repositioned before operating the golf cart.

17. A device for supporting a pivotal windshield pane of a golf cart for use as a tabletop, the pivotal windshield pane including a top lip angled and extending from the pivotal windshield pane, the support device comprising:
at least one lateral support member that engages and supports the pivotal windshield pane; and
two spaced-apart upright support members extending from the lateral support member and supporting the pivotal windshield pane in a horizontal position for tabletop use, wherein a first end of each upright support member extends from the lateral support member and a second opposite end of each upright support member includes an attachment that mounts the second end of the upright support member to the golf cart to support the pivotal windshield pane in the horizontal position for tabletop use, wherein the upright support members mount to the golf cart at locations that are rearward from the top lip of the pivotal windshield pane, and are angled from vertical, when the pivotal windshield pane is in the horizontal position for tabletop use, and wherein the upright support members support the lateral support member from below, with the upright support members loaded in compression, when the pivotal windshield pane is in the horizontal position for tabletop use,
wherein the golf cart includes two retaining clips that receive and secure the lip of the pivotal windshield pane in a stowed position, and wherein the attachments each include at least one tab that is received and secured in the retaining clip when the pivotal windshield pane is in the horizontal position for tabletop use.

18. The support device of claim 17, wherein the lateral support member engages the top lip of the pivotal windshield pane and is received in a space between the top lip and a top portion of the pivotal windshield pane from which the top lip extends.

19. The support device of claim 17, wherein the first ends of the upright support members each adjustably mount to the lateral support member by a coupling so that the upright support members can be mounted at user-selected locations along the lateral support member to position the second opposite end of each upright support member where needed to mount to the golf cart.

20. The support device of claim 17, wherein the tab of each attachment is angled with respect to the respective upright support member.

\* \* \* \* \*